United States Patent
Merritt et al.

(10) Patent No.: US 6,183,793 B1
(45) Date of Patent: Feb. 6, 2001

(54) BAKED BEAN FOOD PRODUCT AND METHOD OF MAKING

(76) Inventors: Robert E. Merritt; Lori J. Merritt, both of 303 S. Polk St., Cabot, AR (US) 72023

(*) Notice: Under 35 U.S.C. 154(b), the term of this patent shall be extended for 0 days.

(21) Appl. No.: 09/434,808

(22) Filed: Nov. 5, 1999

(51) Int. Cl.⁷ ........................................................ A23L 1/01
(52) U.S. Cl. .......................... 426/314; 426/639; 426/629; 426/650
(58) Field of Search ...................................... 426/314, 629, 426/615, 634, 638, 639, 650

(56) References Cited

U.S. PATENT DOCUMENTS

| | | |
|---|---|---|
| D. 339,744 | 9/1993 | Seppala . |
| D. 343,494 | 1/1994 | Thorniley et al. . |
| 4,393,090 | 7/1983 | Coroneos . |
| 4,396,817 | 8/1983 | Eck et al. . |
| 4,597,974 | 7/1986 | Fonreneau et al. . |
| 4,693,900 | 9/1987 | Molinari . |
| 4,935,259 | 6/1990 | Vella . |
| 5,106,643 | 4/1992 | Laufer . |
| 5,258,198 | 11/1993 | Bastian et al. . |
| 5,260,083 | 11/1993 | Brain et al. . |
| 5,356,648 | 10/1994 | Kortschot . |

*Primary Examiner*—Milton Cano

(57) ABSTRACT

A baked bean food product and method of making for a flavorful baked bean and smoked pork side dish. The baked bean food product and method of making includes ketchup, maple syrup, Worcestershire sauce, dark brown sugar, cayenne pepper, black pepper, pork and beans, smoked onions and smoked pork. The ketchup, maple flavored syrup, Worcestershire sauce, dark brown sugar, cayenne pepper and black pepper are mixed together. The additional ingredients are added individually to the mixture and mixed prior to the addition of the next ingredient. Upon obtaining the final mixture of ingredients, the final mixture is smoked for a period of time prior to serving.

14 Claims, 1 Drawing Sheet

BAKED BEAN FOOD PRODUCT AND METHOD OF MAKING

BACKGROUND OF THE INVENTION

1. Field of the Invention

The present invention relates to food products and methods of making food products and more particularly pertains to a new baked bean food product and method of making a flavorful baked bean and smoked pork side dish.

2. Description of the Prior Art

The use of food products and methods of making food products is known in the prior art. More specifically, food products and methods of making food products heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,260,083; U.S. Pat. No. 5,258,198; U.S. Pat. No. 4,693,900; U.S. Pat. No. 4,393,090; U.S. Pat. No. 4,396,817; and U.S. Pat. No. 5,356,648; U.S. Pat. No. 5,106,643; U.S. Pat. No. 4,935,259; and U.S. Pat. No. 4,597,974.

While these food products and methods fulfill their respective, particular objectives and requirements, the aforementioned patents do not disclose a new baked bean food product and method of making. The inventive product and method includes ketchup, maple syrup, Worcestershire sauce, dark brown sugar, cayenne pepper, black pepper, pork and beans, smoked onions and smoked pork.

In these respects, the baked bean food product and method of making according to the present invention substantially departs from the conventional concepts of the prior art, and in so doing provides a food product and method primarily developed for the purpose of providing a flavorful baked bean and smoked pork side dish.

SUMMARY OF THE INVENTION

In view of the foregoing disadvantages inherent in the known types of food products and methods of making food products now present in the prior art, the present invention provides a new baked bean food product and method of making wherein the same can be utilized for providing a flavorful baked bean and smoked pork side dish.

The general purpose of the present invention, which will be described subsequently in greater detail, is to provide a new baked bean food product and method of making which has many of the advantages of the food products and methods of making food products mentioned heretofore and many novel features that result in a new baked bean food product and method of making which is not anticipated, rendered obvious, suggested, or even implied by any of the prior art food products and methods of making food products, either alone or in any combination thereof.

To attain this, the present invention generally comprises a mixture of ketchup, maple syrup, Worcestershire sauce, dark brown sugar, cayenne pepper, black pepper, pork and beans, smoked onions and smoked pork that is subsequently smoked.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details set forth in the following description. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other products and methods for carrying out the several purposes of the present invention. It is important, therefore, that the claims be regarded as including such equivalent products insofar as they do not depart from the spirit and scope of the present invention.

It is therefore an object of the present invention to provide a new baked bean food product and method of making which has many of the advantages of the food products and methods of making food products mentioned heretofore and many novel features that result in a new baked bean food product and method of making which is not anticipated, rendered obvious, suggested, or even implied by any of the prior art food products and methods of making food products, either alone or in any combination thereof.

It is another object of the present invention to provide a new baked bean food product and method of making which may be easily and efficiently manufactured and marketed.

An even further object of the present invention is to provide a new baked bean food product and method of making which is susceptible of a low cost of manufacture with regard to both materials and labor, and which accordingly is then susceptible of low prices of sale to the consuming public, thereby making such baked bean food product and method of making economically available to the buying public.

Still yet another object of the present invention is to provide a new baked bean food product and method of making which provides in the products and methods of the prior art some of the advantages thereof, while simultaneously overcoming some of the disadvantages normally associated therewith.

Still another object of the present invention is to provide a new baked bean food product and method of making for providing a flavorful baked bean and smoked pork side dish.

Yet another object of the present invention is to provide a new baked bean food product and method of making which includes a mixture of ketchup, maple syrup, Worcestershire sauce, dark brown sugar, cayenne pepper, black pepper, pork and beans, smoked onions and smoked pork that is subsequently smoked.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
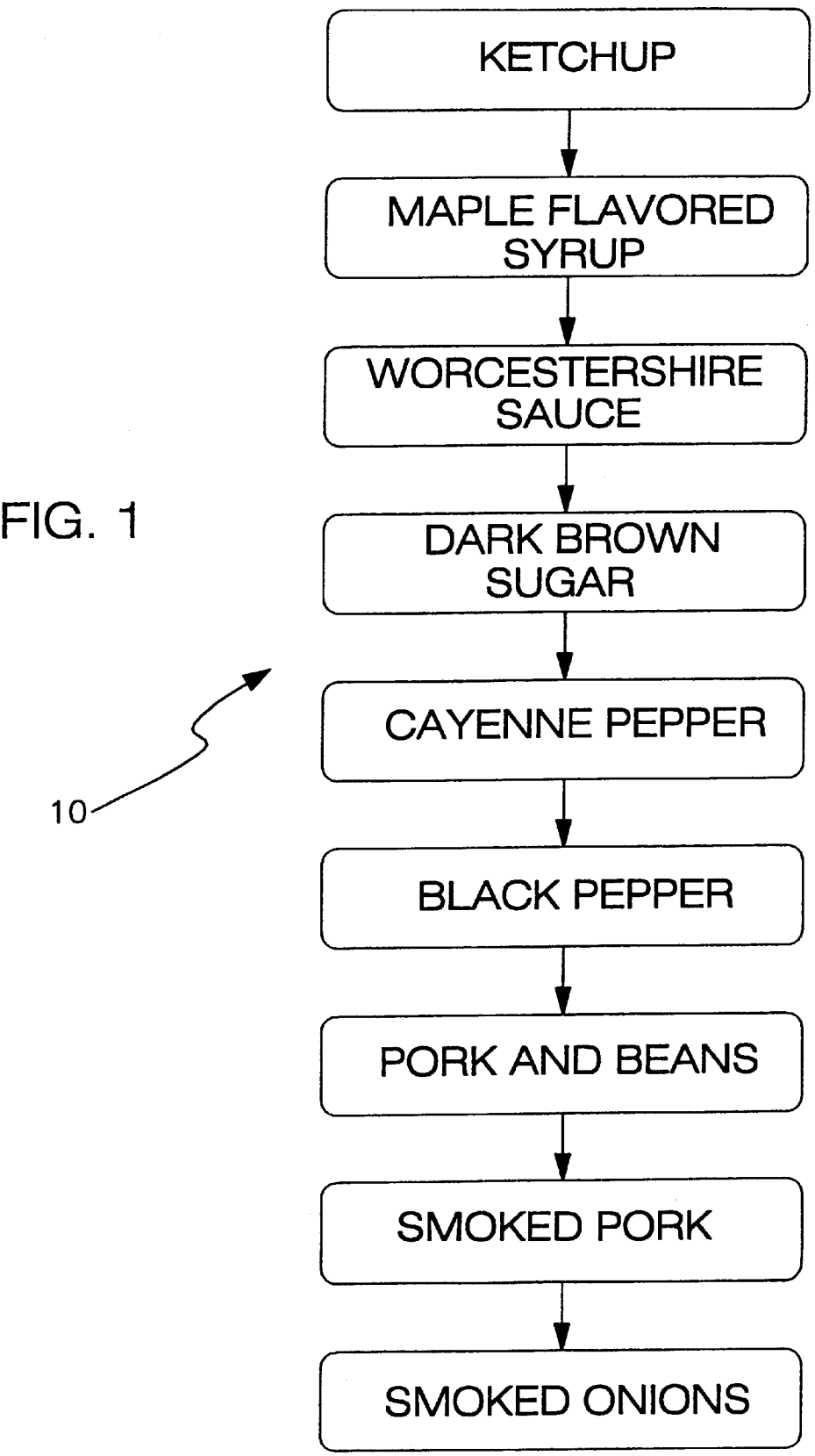
FIG. 1 is a schematic table of ingredients for a new baked bean food product and method of making according to the present invention.

With reference now to the drawing, a new baked bean food product and method of making embodying the principles and concepts of the present invention and generally designated by the reference numeral 10 will be described.

The baked bean food product 10 and method of making generally comprises the steps of providing about 4 gallons of ketchup, about 2 gallons of maple flavored syrup, about 1 gallon of Worcestershire sauce, about 20 cups of dark brown sugar, about ¼ cup of cayenne pepper, about ¼ cup of black pepper, about 1 gallon of canned pork and beans, about 1 pound of smoked pork, and about 1½ cups of smoked onions.

The ketchup, maple flavored syrup, Worcestershire sauce, dark brown sugar, cayenne pepper and black pepper are mixed well to form a first mixture. A wire wisk is used for facilitating mixture of the ingredients.

About 4 cups of the first mixture are separated for mixture with the other ingredients. The canned pork and beans are added to about 4 cups of the first mixture and the canned pork and beans and first mixture are mixed together using a spoon to form a second mixture in which the first mixture is substantially evenly distributed through the second mixture.

The smoked pork is added to the second mixture and mixed with a spoon to form a third mixture. The smoked pork may be either cut into small chunks prior to addition to the second mixture or may be added as larger chunks and allowed to flake off into smaller pieces.

Finally, the smoked onions are added to the third mixture and again mixed with a spoon to form a final mixture. The final mixture is smoked for additional cooking time and addition of hickory smoke flavor. Smoking of the final mixture is optimally about 4 hours but may be between about 2 hours and 6 hours depending on desired taste.

As to a further discussion of the manner of usage and operation of the present invention, the same should be apparent from the above description. Accordingly, no further discussion relating to the manner of usage and operation will be provided.

With respect to the above description then, it is to be realized that the optimum quantitative relationships for the ingredients of the invention, to include variations in brand, size, shape, and form are deemed readily apparent and obvious to one skilled in the art, and all equivalent relationships to those illustrated in the drawing and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact quantitative relationships shown and described, and accordingly, all suitable modifications and equivalents may be resorted to, falling within the scope of the invention.

We claim:

1. A method of making a baked bean food product, the steps of the method comprising:

providing an amount of ketchup, an amount of maple flavored syrup, an amount of Worcestershire sauce, an amount of dark brown sugar, an amount of cayenne pepper, an amount of black pepper, an amount of canned pork and beans, an amount of smoked pork, and an amount of smoked onions;

mixing said ketchup, maple flavored syrup, Worcestershire sauce, dark brown sugar, cayenne pepper and black pepper to form a first mixture;

adding said canned pork and beans to said first mixture and mixing said canned pork and beans with said first mixture;

adding said smoked pork to said second mixture and mixing to form a third mixture;

adding said smoked onions to said third mixture and mixing to form a final mixture; and smoking said final mixture prior to serving.

2. The baked bean food product produced according to the method of claim 1.

3. The method of claim 1 wherein said amount of ketchup is about 4 gallons, said amount of maple flavored syrup is about 2 gallons, said amount of Worcestershire sauce is about 1 gallon, said amount of dark brown sugar is about 20 cups, said amount of cayenne pepper is about ¼ cup, and said amount of black pepper is about ¼ cup.

4. The method of claim 2 wherein said canned pork and beans are added to about 4 cups of said first mixture to form said second mixture.

5. The method of claim 4 wherein said amount of canned pork and beans is about 1 gallon.

6. The method of claim 4 wherein said amount of smoked pork is about 1 pound.

7. The method of claim 4 wherein said amount of smoked onions is about 1½ cups.

8. The baked bean food product produced by the method of claim 3.

9. The baked bean food product produced by the method of claim 4.

10. The baked bean food product produced by the method of claim 5.

11. The baked bean food product produced by the method of claim 6.

12. The baked bean food product produced by the method of claim 7.

13. A method of making a baked bean food product, the steps of the method comprising:

providing about 4 gallons of ketchup, about 2 gallons of maple flavored syrup, about 1 gallon of Worcestershire sauce, about 20 cups of dark brown sugar, about ¼ cup of cayenne pepper, about 1¼ cup of black pepper, about 1 gallon of canned pork and beans, about 1 pound of smoked pork, and about 1½ cups of smoked onions;

mixing said ketchup, maple flavored syrup, Worcestershire sauce, dark brown sugar, cayenne pepper and black pepper with a wire wisk to form a first mixture;

separating about 4 cups of said first mixture;

adding said canned pork and beans to said about 4 cups of said first mixture and mixing said canned pork and beans with said about 4 cups of said first mixture using a spoon to form a second mixture;

adding said smoked pork to said second mixture and mixing with said spoon to form a third mixture;

adding said smoked onions to said third mixture and mixing with said spoon to form a final mixture; and smoking said final mixture for about 4 hours.

14. The baked bean food product produced by the method of claim 13.

* * * * *